Figure 1:
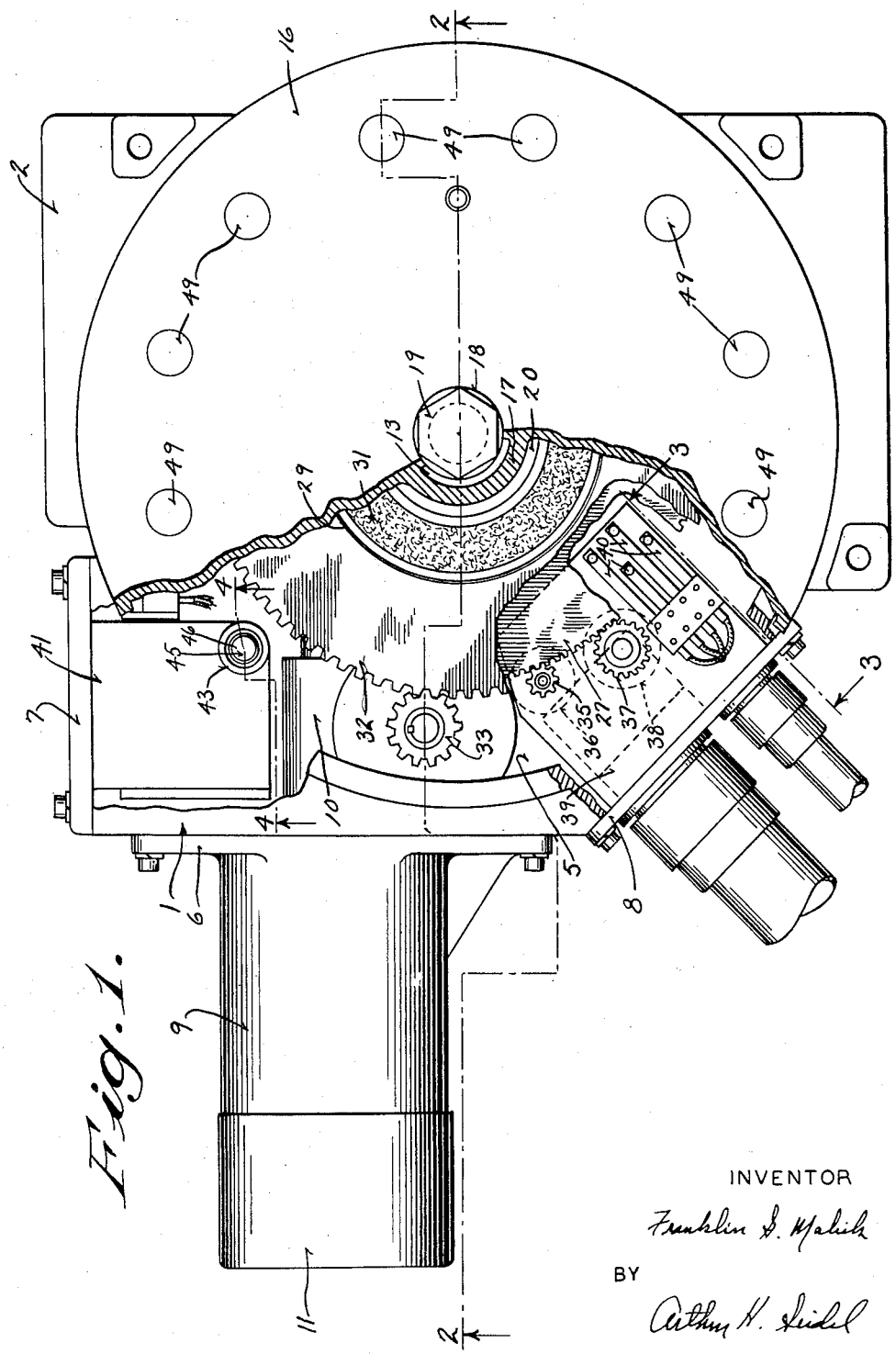

Feb. 3, 1959 F. S. MALICK 2,871,727
CONTROL DRIVE APPARATUS
Filed Feb. 13, 1956 4 Sheets-Sheet 1

INVENTOR
Franklin S. Malick
BY
Arthur H. Seidel
ATTORNEY

Feb. 3, 1959 F. S. MALICK 2,871,727
CONTROL DRIVE APPARATUS
Filed Feb. 13, 1956 4 Sheets-Sheet 3

INVENTOR
Franklin S. Malick
BY
Arthur H. Seidel
ATTORNEY

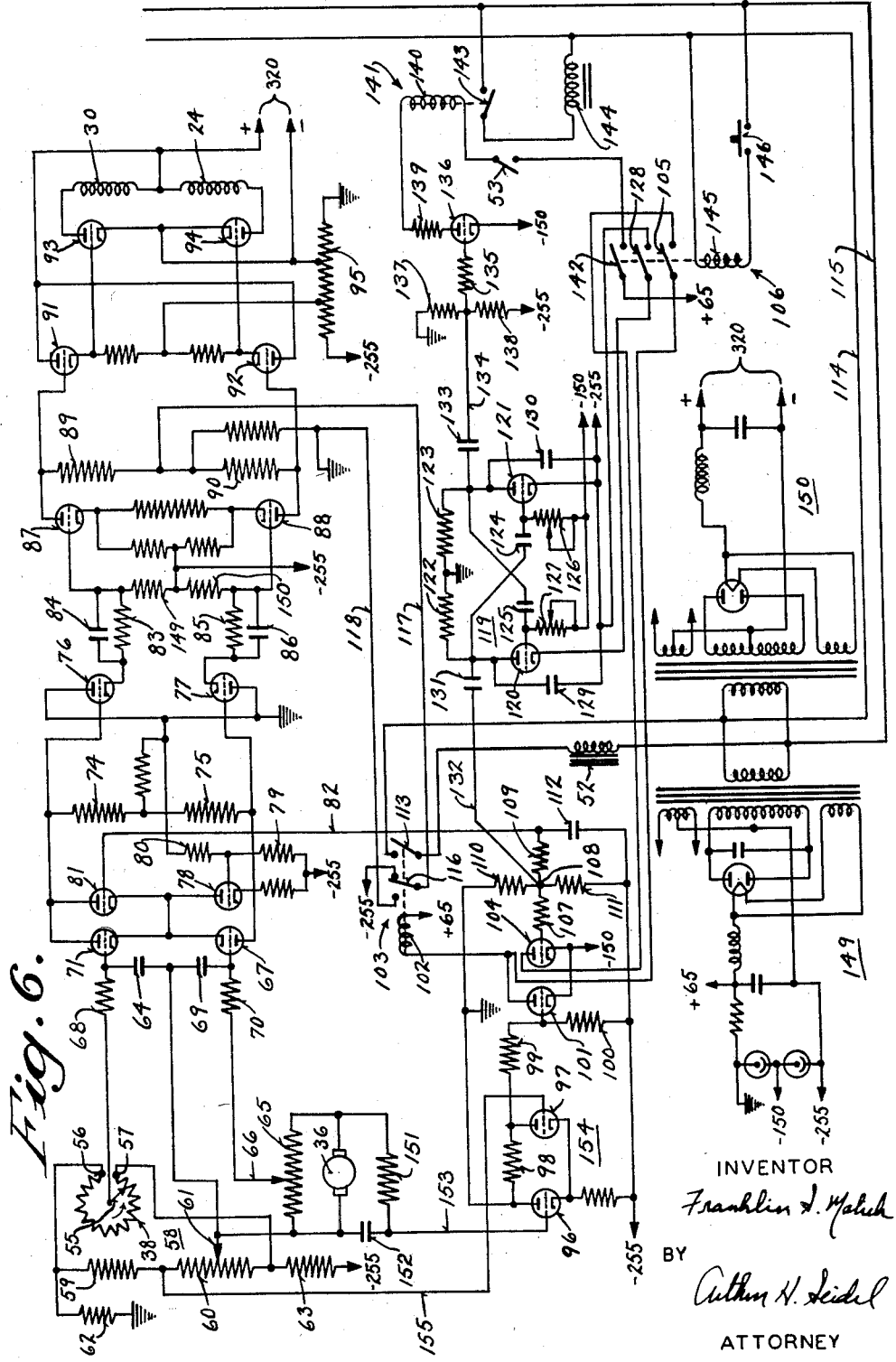

United States Patent Office 2,871,727
Patented Feb. 3, 1959

2,871,727

CONTROL DRIVE APPARATUS

Franklin S. Malick, Milwaukee, Wis.

Application February 13, 1956, Serial No. 565,082

17 Claims. (Cl. 74—813)

This invention relates to apparatus having a member progressively rotated between successive positions of index that may be used to advance work to a machine, and for similar purposes, and it more specifically resides in an apparatus having a rotatable index member that is progressed through successive positions of index by an electromagnetic drive controlled through an electric circuit network that may govern both the movements of the index member and the machine to which the apparatus is conveying work.

In my co-pending application for Letters Patent, Serial No. 474,226, filed December 9, 1954 there is shown apparatus for conveying work to a machine in successive movements which includes a work conveying member, termed an index plate, that is rotated between successive positions of index together with a circuit for controlling movements of the index plate. The present invention includes a similar index plate together with controls therefor that give rise to improved control for the movement of work and the like in progressive indexed steps to and from an associated machine.

For feeding work to a machine, that repeats a particular operation, it is a customary requisite that the work be fed to and removed from the machine in successive steps. For example, a punch press feeds and retracts punches to and from a die in repeated work strokes, and the work must be advanced into the die, held in place until the machine operation is performed, and then removed. The work must then be advanced to a successive position in which the operation will be repeated. Hence, successive movements for the work are necessary where it is to be conveyed automatically to the machine, and each movement must terminate in precise indexed position in order to accurately locate the work with respect to the machine.

It is desirable when work is advanced in successive steps that the work be fed to the machine with a minimum of delay, and that it likewise be carried from the machine as quickly as possible. This requirement calls for a control that actuates the conveying apparatus and the machine tool in close sequence to one another. In the present invention it is an object to provide a control for material handling apparatus that conveys work in precise steps that supervises the initiation of the work stroke of a machine tool and the movement of the work so that one may immediately follow the completion of the other. In providing such an apparatus the invention contemplates a control that includes an electric circuit network having timing circuits which initiate both stepped movements of an index member that conveys the goods, and the work stroke of the machine. Also, it is contemplated in the present invention to provide an apparatus that may be applied to any of a number of machines, with but only a few simple adjustments being necessary to couple the apparatus of the invention with a machine. Thus, in the use of the invention there will be no need of complex alteration of either the material conveying apparatus or of any particular machine with which it may be used. The invention therefore provides an apparatus of wide-spread application.

It is another object of this invention to provide a material conveying apparatus that accurately positions the work in an indexed position. The manner of positioning includes the use of a mechanical lock that engages the index plate as it arrives in indexed position, which lock is fully disengaged before the next movement of the plate is commenced. The lock is held disengaged when the plate is moving to be free of interference with plate movement.

It is another object of this invention to provide a material conveying apparatus in which a control circuit forming a part thereof actuates a machine tool in conjunction with which the apparatus is employed for obtaining fully automatic operation.

It is another object of this invention to provide a material conveying apparatus for use in conjunction with a machine that requires only a minimum of electrical and mechanical connections to be made between the apparatus and the machine.

It is another object of this invention to provide a material conveying apparatus including an index plate having safety control circuits that prohibit the operation of an associated machine unless the index plate is in indexed position.

It is another object of this invention to provide a material conveying apparatus having a drive motor for driving an index plate in which driving connections between the motor and the plate are disengaged if the plate is brought to standstill.

It is another object of this invention to provide a material conveying apparatus that includes an index plate to advance the work pieces which may be readily moved, without hindrance from the apparatus itself, in the event there is a stoppage of the index plate while moving between indexed positions.

The foregoing and other objects and advantages of this invention will appear in the description to follow. In the description reference is made to the accompanying drawings, which form a part hereof, and in which there is shown by way of illustration and not of limitation a specific form in which the invention may be embodied.

Figure 2:
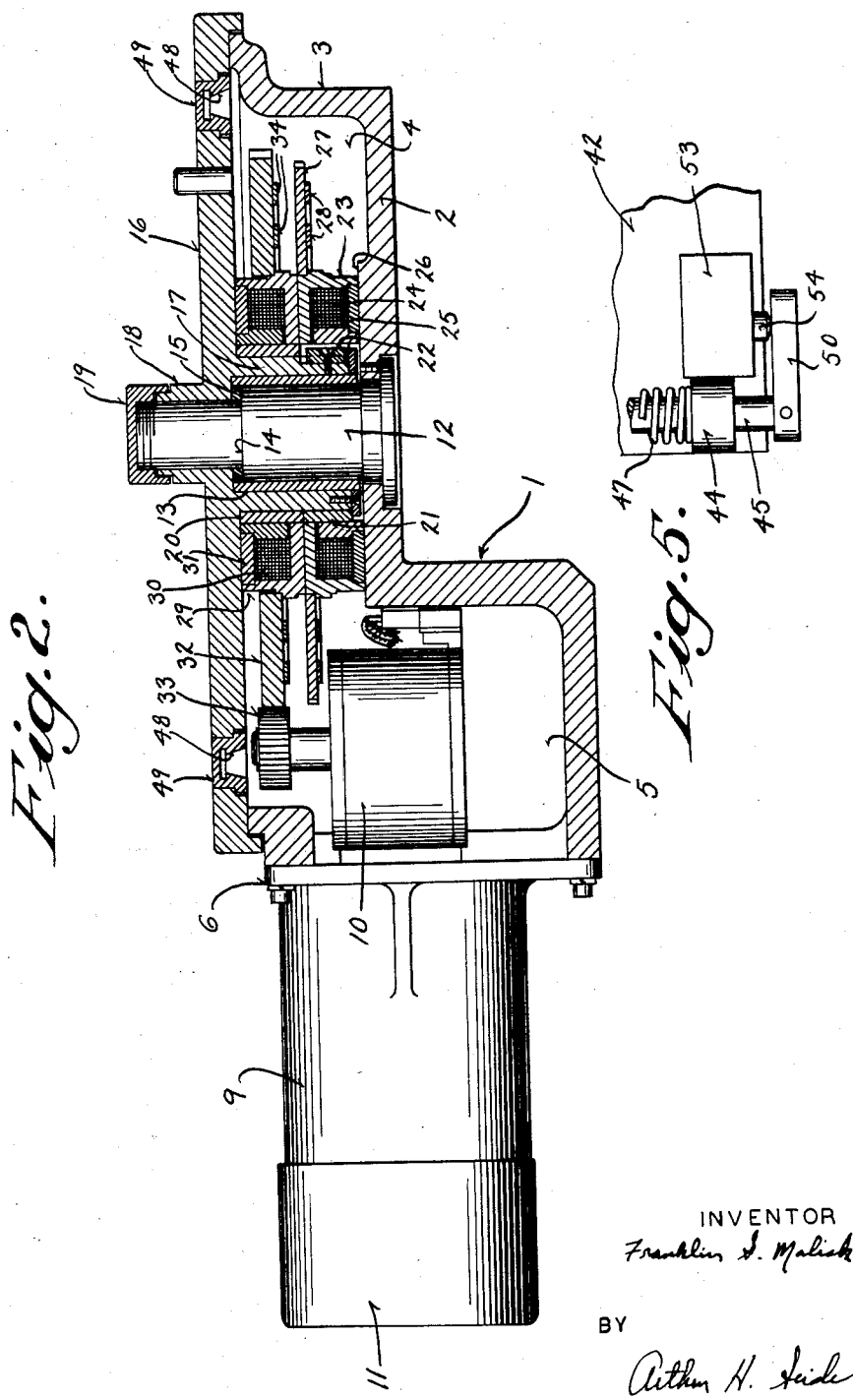
Figure 3:
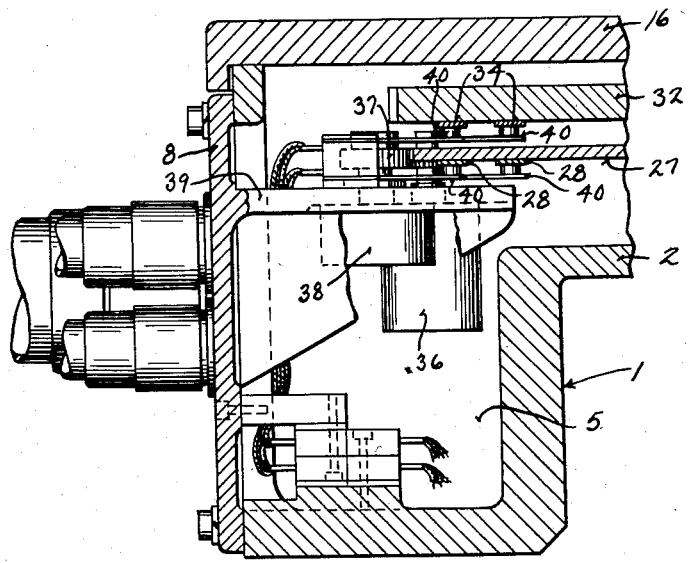
Figure 4:
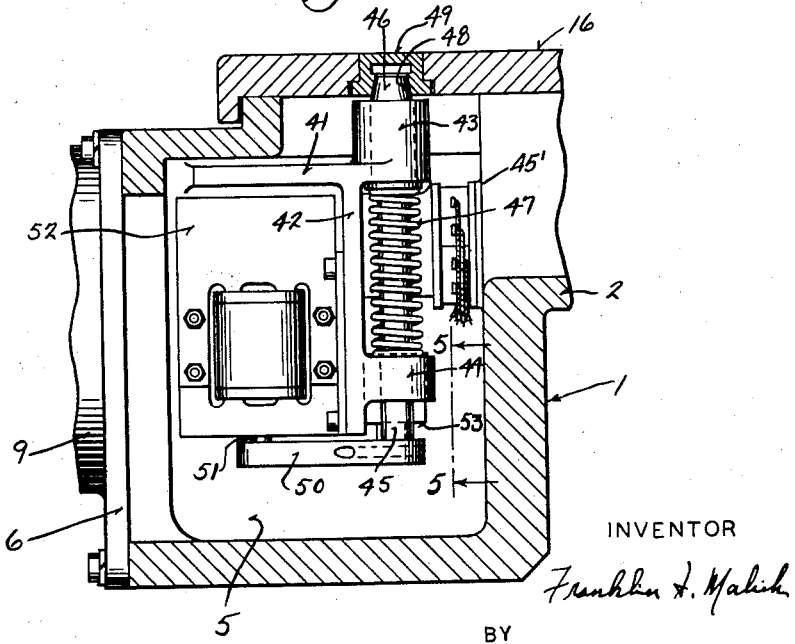

In the drawings:

Fig. 1 is a plan view with parts broken away and in section of material conveying apparatus employing the invention, Fig. 2 is a view in elevation and in section of the apparatus viewed through the plane 2—2 shown in Fig. 1, Fig. 3 is a fragmentary view in elevation and in section viewed through the plane 3—3 shown in Fig. 1, Fig. 4 is a fragmentary view in elevation and in section viewed through the plane 4—4 shown in Fig. 1, Fig. 5 is a fragmentary view in elevation viewed through the plane 5—5 shown in Fig. 4, and Fig. 6 is a wiring diagram of a control circuit forming a part of the apparatus.

Referring now to the drawings, there is shown a main casing 1 of complex configuration which has a base 2 from which side wall 3 rises upwardly to present an open topped interior 4. On the left hand side, as viewed in Figs. 1–4, the casing 1 drops downwardly from the base 2 to present a deep cavity 5 that has a set of three openings in its side walls that are enclosed by cover plates 6, 7 and 8.

The cover plate 6 is an integral portion of the housing of a drive motor 9 and attached to the drive motor 9 is a gear reduction unit 10 that extends to within the cavity 5. The end of the motor 9 opposite the cover plate 6 carries a flywheel housing 11 within which there is a flywheel, not shown.

An upright fixed stationary stub shaft 12 is fastened in the base 2 of the casing 1. The shaft 12 is encircled by a sleeve bearing 13 and resting on a shoulder 14, formed in the shaft 12, is a ring 15. Seated upon the ring 15 is a circular index plate 16 that encloses the open top of the casing 1. The plate 16 is formed with an integral sleeve portion 17 that closely fits about the sleeve bearing 13 and an upper sleeve portion 18 that encircles the upper portion of the shaft 12. Capping the sleeve portion 18 and the shaft 12 is a threaded nut 19.

An upper sleeve bearing 20 and a lower ring 21 encircle the sleeve portion 17 of the index plate 16, with the lower ring 21 being keyed to the index plate 16 by means of a key 22. Therefore, the lower ring 21 rotates with the index plate 16. Attached to the lower ring 21, so as to rotate therewith, is a magnetic brake member 23 which includes an operating coil 24. The operating coil 24 is imbedded in magnetic material forming the brake member 23 and a braking surface is presented by a flat ring of brake band material 25 facing a smooth raised braking surface 26 in the base 2. Thus, upon energization of the coil 24 magnetic attraction between the base 2, which is of magnetic material, and the magnetic brake member 23 causes a frictional engagement which will give rise to braking drag upon the index plate 16 in the event that the plate 16 be rotating.

A gear wheel 27 completes and rotates with the electromagnetic brake member 23. On the under side of the gear wheel 27 are a pair of slip rings 28 for conducting operating current to the coil 24.

Directly above the brake member 23 and surrounding the sleeve bearing 20 is an electromagnetic clutch member 29 that has an annular coil 30 and a clutch lining 31. The lining 31 faces upwardly for frictional engagement with the under side of the index plate 16. Integral with the clutch member 29 is a driving gear wheel 32 that is in mesh with an output pinion 33 of the gear reduction unit 10. Thus, the motor 9 drives the gear wheel 32 through the gear reduction unit 10 and its output pinion 33 to impart rotation to the electromagnetic clutch member 29. The clutch member 29 is free to rotate on sleeve bearing 20 independently of both the index plate 16 and of the brake member 23. Upon energization of the operating coil 30 frictional engagement is set up between the clutch 29 and the under side of the index plate 16, which is of magnetic material, to rotate the plate 16 in response to rotation of the clutch member 29. Thus by energization and deenergization of the coils 24 and 30 the index plate 16 may be rotated or brought and held at a standstill. For the purpose of making electrical connection with the annular coil 30 of the electromagnetic clutch member 29 there is provided a pair of slip rings 34 on the under side of the gear wheel 32.

The gear wheel 27 is in mesh with a pinion 35 on the input shaft of a tachometer generator 36, and is also in mesh with a pinion 37 on the shaft of a potentiometer 38. The generator 36 and the potentiometer 38 are each mounted on a shelf 39 which extends inwardly from the cover plate 8. Also mounted upon the shelf 39 of the cover plate 8 is a set of four brushes 40 which are in electrical contact with the slip rings 28 and 34, so as to supply the coils 24 and 30 with operating current. Upon a rotation of the index plate 16 the generator 36 and the potentiometer 38 are each rotated to obtain an output signal from the generator 36 and a change in resistance across terminals of the potentiometer 38. The generator 36 has a signal output dependent upon the speed of rotation, and the potentiometer 38 by changing the resistance between terminals, as rotation occurs, signifies the position of the index plate 16. The manner in which these circuit components are utilized will be hereinafter explained.

The cover plate 7 has an inwardly extending shelf 41, as is shown in Figs. 1 and 4, and a vertical rib 42 extends downwardly beneath the shelf 41. A boss 43 rises from the shelf 41 and directly beneath the boss 43 is an ear 44 that extends outwardly from the side of the rib 42. A pin 45 extends through the boss 43 and ear 44 and presents a tapered end 46 extending upwardly above the boss 43. A spring 47 encircles the pin 45 with its lower end, as seen in Fig. 4, resting against the top of the ear 44 and with its upper end pushing against the underside of a collar 45' that is an integral part of the pin 45. The spring 47 is in compression and hence biases the pin 45 upwardly into a position whereby the tapered end 46 will engage mating openings 48 in a set of bushings 49 that are uniformly spaced circumferentially in the index plate 16. The bottom end of the pin 45 is pinned to a plate 50, shown in Figs. 4 and 5, and a plunger 51 of an electromagnetic solenoid 52 rests upon the plate 50. Upon energization of the solenoid 52 the plunger 51 is driven downwardly, to depress the plate 50 and hence move the pin 45 downwardly against the bias of the spring 47. Downward movement of the pin 45 carries the tapered end 46 out of an insert 49 to free the index plate 16 for rotation.

Attached to the rib 42 is a precision switch 53, having an operating button 54 that rests upon the plate 50. Upon the plate 50 being moved downwardly the switch 53 will move its contacts into a normally open position to indicate the position of the pin 45.

The electrical circuit in which the coils 24, 30, the tachometer generator 36, the potentiometer 38, the solenoid 52, and the precision switch 53 are a part is shown schematically in Fig. 6. The potentiometer 38, with its rotatable sliding contact 55 and end taps 56 and 57 form two legs of a bridge network 58. The bridge network 58 is completed by a first fixed bridge resistor 59 and a second fixed bridge resistor 60 which has an adjustable tap 61. The input voltage for the bridge network 58 is supplied through a grounded resistor 62 connected to the corner of the bridge 58 between the resistor 59 and the end tap 56 of the potentiometer 38, and through a resistor 63 connected to the opposite bridge corner formed between the bridge resistor 60 and the potentiometer end tap 57. The resistor 63 is joined, at its opposite end, with a power supply of 255 volts below ground.

When the potentiometer sliding contact 55 is in a position such that the potential drop between the taps 55 and 56 is equivalent to that across the bridge resistor 59 and the adjacent portion of resistor 60 up to the tap 61, the output voltage of the bridge network 58, taken between the potentiometer sliding contact 55 and the tap 61, is zero. This is the position of the potentiometer tap 55 which corresponds to an indexed position of the index plate 16, and if the plate 16 be rotated from the position of index the sliding contact 55 will likewise be rotated, so as to be indicative of index plate position by providing a variation in the output voltage of the bridge network 58. For example, if the position of the sliding contact 55 shown in Fig. 6 be taken as the position at which the bridge network output voltage is zero, then a counterclockwise shift of the sliding contact 55 toward the end tap 57 will create an unbalance of the bridge with a corresponding output signal. As the sliding contact 55 is moved closer to the end terminal 57 the output voltage of the bridge network 58 will increase. In practice the sliding contact 55 is closely adjacent the tap 57 when corresponding to indexed position, so that upon any substantial continued counterclockwise rotation of the sliding contact 55 is quickly moved to a position beyond the tap 57 and also beyond the tap 56. Upon the sliding contact 55 passing the tap 56 the voltage output of the bridge network 58 will change in polarity, and also there will be a substantial increase in bridge output voltage. As the sliding contact 55 is now continued in a counterclockwise direction, thus returning toward its original position of rest, the potential output of the bridge network 58 will decrease and once again become zero as the sliding contact 55 assumes its original position. Thus, output voltage of the bridge network 58 is indicative of the position of the index plate 16.

In the apparatus shown in the drawings a position of index for the plate 16 is such a position wherein the pin 45 may engage an opening 48 in a bushing 49. Thus the angular spacing between adjacent bushings 49 is the distance traveled by the index plate 16 between successive positions of index, and the potentiometer sliding contact 55 makes one complete revolution for each plate movement between successive index positions. In this fashion there is provided a signal circuit network that is informative of index plate position with respect to indexed position.

A potentiometer 65 with a sliding contact 66 is connected across the tachometer 36 to provide a means for using only a portion of the generated voltage. One end of tachometer 36 and potentiometer 65 is connected to the tap 61, which is one output terminal of the bridge network 58, so that the output voltage of the tachometer 36, or that fraction of the voltage selected by adjusting the sliding contact 66, will be added to the output of the bridge network 58. This total voltage becomes an input signal applied between the grids of amplifier tubes 67 and 71. A capacitor 64 and a resistor 68 in series with the output lead from the bridge network form a filter to remove noise from the output signal of the bridge network and a capacitor 69 and a resistor 70 in series with the lead from the sliding contact 66 on the potentiometer 65 form a filter to remove noise from the tachometer voltage signal. Since the output voltage of the tachometer generator 36 is dependent upon the rotational speed of the index plate 16, the voltage appearing across the grids of the tubes 67, 71 is indicative of both a displacement of the index plate 16, with respect to indexed position, and the velocity of the index plate as it moves between successive positions of index.

The tubes 67, 71 function as a differential amplifier, the output of the amplifier appearing across the resistors 74, 75 and being led to the grids of a differential cathode follower formed by tubes 76 and 77. A tube 78 which functions as a constant current cathode resistor has its plate connected to the cathode of the tubes 67, 71. The cathode of the tube 78 is connected to the voltage supply of 255 volts below ground, and the grid of the tube 78 is supplied with proper bias voltage from the voltage divider formed by resistors 79 and 80. The tube 78 functions to maintain the mean voltage between the plates of the differential amplifier tubes 67, 71 constant even though the mean voltage applied to the grids fluctuates.

A tube 81 has its plate connected to the plate of the tube 71 and its cathode to the cathodes of the tubes 67, 71. The grid of tube 81 is joined to a lead 82, which functions in a manner to be hereinafter described. The tube 81 is non-conducting, except when it is desired to initiate a movement of the index plate 16. For this initiation of movement the grid voltage of the tube 81 is altered by a signal fed over the lead 82, so that the tube 81 will momentarily conduct to place a signal in the amplifier circuits being described.

The tubes 76, 77 are cathode followers which provide a low impedance input to a pair of lead networks in the cathode circuits of these tubes. One lead network comprises a resistor 83 and a capacitor 84 connected in parallel together with a grid resistor 149, and the other comprises a parallel arrangement of a resistor 85 and a capacitor 86 together with a grid resistor 150. It is the purpose of the lead networks to pass high frequency signals through the capacitors 84, 86 to present relatively greater signal voltages to the grids of a pair of differential amplifier tubes 87, 88 when the higher frequency signals are received from the signal circuit of the bridge 58 and tachometer 36. The system is stabilized in this manner and hunting of the index plate 16 is eliminated.

A pair of tubes 87, 88, to which the grid resistors 149, 150 are connected respectively, form a second stage of differential amplification, and have their plates connected to plate load resistors 89, 90. The output voltage is led to the grids of a pair of tubes 91, 92 which function similarly as the tubes 76, 77 by acting as differential cathode followers. As such, the tubes 91, 92 present a low impedance input for the grids of a pair of power amplifier tubes 93, 94. The plate of the tube 93 is connected in series with the clutch coil 30, and the plate of the tube 94 is connected in series with the brake coil 24. A 320 volt supply is used for the plates of the tubes 93, 94, as well as for the tubes 91, 92. The negative side of the 320 volt supply is connected to a point on a potential dividing resistance network 95, which is in turn placed across ground and the 255 volt supply. This fixes the mean value of the currents which flow in the clutch and brake coils 30, 24.

A time delay network consisting of a resistor 151 and a capacitor 152 is connected across the tachometer 36. An output lead 153 from this delay network carries a delayed signal from the tachometer 36 to the grid of a tube 96 which is the cathode follower input tube of a single ended amplifier 154 formed by the tube 96 and a tube 97. A lead 155 is joined at one end to the connection between the resistors 59 and 60 and at its opposite end joins with the grid of the tube 97. The resistors 59, 60 together with the resistors 62 and 63 form a voltage divider between ground and a supply of 255 volts below ground, thus the lead 155 acts to supply grid voltage to the tube 97.

The single ended amplifier 154 amplifies the delayed signal from the tachometer 36, which indicates index plate speed. Input tube 96, being a cathode follower, has its plate connected to ground and a resistor 98 is the plate load for amplifier tube 97. The output of the amplifier 154 is led to the grid of a power amplifier tube 101 through a potential dividing network formed by resistors 99 and 100.

A coil 102 of a relay 103 is the plate load for the power amplifier tube 101. The cathode of the tube 101 is joined to the cathode of a power amplifier tube 104, and both in turn are connected to a power supply of 150 volts below ground. The plate of the tube 104 is joined through contacts 105 of a control relay 106, and hence to the plate of tube 101 and the coil 102 of the contactor 103. In this fashion the relay coil 103 is a common load for tubes 101 and 104.

The grid of the tube 104 is connected through a resistor 107 to a circuit junction 108 in a potential dividing network formed by resistors 110 and 111, so that the tube 104 is normally cut off. The circuit junction 108 in turn is connected through a delay network consisting of resistor 109 and capacitor 112 to the lead 82 extending to the grid of the tube 81. The purpose and operation of the tube 104 will be hereinafter described.

The relay 103 has a first set of normally open contacts 113 which when closed connect the solenoid 52 across power line leads 114 and 115. A second set of contacts 116, for the contactor 103, joins one end of a lead 117 to the minus 255 volt power supply when contactor 103 is deenergized, and to a lead 118 which is grounded, when the contactor 103 is energized. The opposite end of lead 117 brings plate voltage to the amplifier stage formed by tubes 87 and 88.

A timing circuit 119 is shown, which includes a pair of tubes 120, 121 that are coupled to one another to function as a multivibrator. The plates of the tubes 120, 121 are connected through plate load resistances 122, 123 to ground. Also, the plate of the tube 120 is connected through a capacitor 124 to the grid of the tube 121, and the plate of the tube 121 is connected through a capacitor 125 to the grid of the tube 120. A variable resistance 126 connects with the grid of the tube 121 on one end and on the opposite end to a negative 150 volt power supply. Similarly, a variable resistance 127 connects at one end to the grid of the tube 120 and on the opposite end to the same power supply. The cathode of the tube 121 is joined with the negative 255 volt supply and the cathode of the tube 120 connects through a set of contacts 128 of the control relay 106 to the negative 255 volt supply. Filter capacitors 129 and 130 are joined between the respective plates of the tubes 120, 121 and the negative 255 volt supply. From the plate of the tube 120 there is a connection through an output coupling capacitor 131 and a lead 132 to the circuit junction 108. From the plate of the tube 121 there is a connection through an output coupling capacitor 133, a lead 134 and a resistor 135 to the grid of a power tube 136. A resistance potential divider formed by resistors 137 and 138 applies the proper bias voltage to the grid of tube 136. The plate of the tube 136 is connected through a resistance 139 to the coil 140 of a relay 141, and hence through the contacts of the precision switch 53 and normally open contacts 142 of the control relay 106 to a 65 volt plate supply. The relay 141 has a set of normally open contacts 143 that connect a solenoid 144, when closed, across the power line leads 114, 115. The solenoid actuates a machine tool in connection with which the apparatus of the invention may be employed.

The control relay 106 has a winding 145 that is connected through a manually operated start button 146 to the power line leads 114, 115. To form the necessary power supply for the circuits described there is provided a first rectifier circuit 149 which supplies voltages of 65 volts above ground and 150 and 255 volts below ground, and a second rectifier circuit 150 which supplies 320 volts for the plates of the tubes 91, 92, 93 and 94.

With the index plate 16 at rest the tube 101 will be cut off, since there will be no signal from the tachometer 36 to the amplifier 154 that controls the tube 101. If the tube 104 is also cut off, which is the usual condition, relay coil 102 will be deenergized and the contacts 116 in position joining lead 117 to a negative voltage supply. With contacts 116 in this position the plate voltage to the tubes 87, 88 is negative and the tubes 93, 94 are therefore cut off. Brake and clutch coil currents will accordingly be zero and there will be no torque or restraint delivered to the index plate 16. If the index plate 16 be at rest at a point between successive positions of index, due to a malfunction such as a jam, the operator can clear the fault by moving the plate 16 backward, without hindrance of the elements that propel or brake the plate 16.

With the relay 103 deenergized the pin 45 is urged upwardly by the spring 47 and if the index plate 16 be at rest in a position of index, which is the normal position of rest, the pin 45 engages a tapered opening 48 and retains the plate 16 in position, so that any work being moved by the plate 16 will be precisely located with respect to a machine associated with apparatus of the invention. For an example of use with a machine, reference is made to my aforesaid co-pending application, in which an index plate is shown with additional mechanism mounted thereon for moving work to and from a drill press.

Whenever the relay 103 is energized and the relay contacts 116 bring plate voltage to the tubes 87, 88 signal voltage at the grids of tubes 67, 71 is amplified and influences the output of the tubes 93, 94. The circuit is constructed so that a zero input signal at the grids of tubes 67, 71 will cause equal currents to flow in the clutch coil 30 and the brake coil 24. The currents which flow in clutch and brake coils 30, 24 for this condition are about one-half the maximum currents, so that the net friction torque developed by the clutch and brake will be a linear function of the signal to the grids of the tubes 67, 71.

Assuming, now, that the plate 16 is indexed preliminary to a cycle of operation that will carry it to the successive position of index, and that neither of the tubes 101 or 104 is conducting, the coil 102 of the contactor 103 will be deenergized. The contacts 113 are therefore open and the solenoid 52 deenergized permitting locking by the pin 45. Also, the contacts 116 are in position to place a cut-off voltage upon the grids of the tubes 91 and 92, to ensure that the tubes 93, 94 do not conduct while the plate 16 is in indexed position.

The preliminary condition of the tubes 120 and 121, before a cycle of movement is commenced, has the tube 121 conducting and the tube 120 non-conductive. The voltage level at the plate of tube 120 will be relatively high and the voltage level at the plate of conducting tube 121 will be relatively low.

A cycle of movement for the index plate 16 from an initial position of rest in an indexed position to the next successive indexed position is now commenced by an operator closing the start button 146 to energize winding 145 of control relay 106. The resulting closure of contacts 142 is a preliminary switching to ready the relay 141 for energization. The closure of contacts 105 is likewise a preliminary switching operation, which is in the plate circuit of the tube 104. Thus, neither energization of the machine tool actuating solenoid 144 nor energization of the contactor 103, which causes retraction of the pin 45, through firing of the tube 104 may occur unless the operator is expecting an operation, as is indicated by his closure of the button 146.

Closure of the contacts 128 connects the cathode of the tube 120 in the timing circuit 119 to the negative 255 volt supply. Tube 120 will now conduct and the voltage at its plate falls. The charge on capacitor 124 then causes tube 121 to be cut off, with the result that the voltage at its plate rises. The rise of the voltage level at the plate of tube 121 causes a momentary increase at the grid of the tube 136, to permit this tube to conduct. Since the precision switch 53 is already closed, the pin 45 being in raised position, the tube 136 will conduct and energize coil 140. Upon energization of coil 140 contacts 143 are closed to energize the solenoid 144 and hence an associated machine will be actuated.

A circuit comprising the capacitor 124 and the variable resistance 126, each of which are in the grid circuit of the tube 121, now determines the time interval before which the tube 121 will again conduct. The time interval is determined by the charging rate of the capacitor 124, which in turn is dependent upon the value of resistance 126. By adjustment of the resistance 126 the time interval is given a sufficient duration to permit the machine tool, with which the apparatus is being employed, to carry out its cycle of operation.

Upon the tube 121 again conducting tube 120 is immediately cut off by the charge on capacitor 125. The voltage at the plate of the tube 120 will then rise and a signal pulse will be transmitted through the capacitor 131 to the circuit junction 108. The grid of the tube 104 is thereby affected to cause the tube 104 to conduct briefly. Conduction of the tube 104 energizes the coil 102 of relay 103 to operate contacts 113 and 116. Closure of the contacts 113 energizes the solenoid 52. The plunger of the solenoid 52 will then move downwardly and strike the plate 50 which will retract the pin 45, to leave the index plate 16 free to be moved in response to the clutch and brake elements. Movement of the contacts 116 to the left removes the cut-off potential which has previously been applied to the grids of the tubes 91 and 92.

The rise in the voltage at the circuit junction 108, which raised the grid of the tube 104 to cause it to fire, also affects the potential level of the lead 82. The time delay network formed by resistor 109 and capacitor 112 delays the change of potential level of the lead 82 until after tube 104 has started to conduct and the pin 45 has been lowered by the solenoid 52. Thus the firing of the tube 81 is delayed with respect to first conduction of tube 104. When the tube 81 conducts it unbalances the amplifier circuits to which it is joined to cause a current to flow in the clutch coil 24. Conduction by the tube 81 is only momentary, to produce an initial current through the clutch coil 24 that causes an initial rotation of the index plate 16 wherein the potentiometer sliding contact 55 is moved toward and then beyond the end tap 57, and beyond the end tap 56.

The initial movement of the index plate 16, under the influence of the momentary signal from tube 81, unbalances the bridge circuit 58 with a resultant information signal appearing across the grids of tubes 67, 71 that causes a maximum differential change in the output of the amplifier circuits that produce a maximum clutching friction and insignificant brake action.

An output signal from tachometer 36, is also presented to the grid of tube 96 through the lead 70. The plate voltage of tube 97 rises and causes the tube 101 to conduct and thereby retain the coil 102 of the relay 103 energized after conduction of tube 104 ceases. In this manner the pin 45 is held in retracted position as the index plate 16 travels from one indexed position to the next.

As the index plate 16 increases speed, at the outset of its movement, the tachometer output increases correspondingly, which output is in opposition to that of the bridge network 58. As the index plate approaches the succeeding indexed position the output of bridge 58 lessens and finally becomes less than the output from the tachometer 36 so that the polarity of the signal fed into tubes 67, 71 is reversed. This causes the brake coil current to exceed the clutch coil current so that a net braking is applied to reduce the speed of the index plate as it approaches the index position. Throughout the braking period the amplifier adjusts the current in the clutch coil 30 and the brake coil 24 so that a net friction torque is developed which causes the speed of the index plate to be proportional to the distance remaining to be traveled to the position of index. Thus just as the position of index is reached, the output of the bridge network 58 and the tachometer 36 are both zero.

As indexed position is reached the signal to the grid of amplifier tube 96 is decreased with a corresponding drop in the plate current of tube 101. Coil 102 will be deenergized and the contacts 113, 116 of relay 103 will assume normal position. The solenoid 52 is thus deenergized and the tapered pin 45 will move upwardly to engage a tapered opening 48 in the index plate 16. In this manner a very accurate position of index is achieved.

Upon the contacts 116 returning to normal position a negative voltage is again placed on the grids of tubes 91 and 92, to ensure that the plate currents of tubes 93 and 94 are cut off. Also, as the index plate 16 is positioned in its next successive position of index the output voltages of the bridge network 58 and the tachometer again become zero to present no influence on the amplifier circuits. The index plate has therefore been moved from one indexed position to the next and circuits governing the movements thereof are readied for the next successive cycle of movement.

The time of operation of the machine tool, which is operated through the solenoid 144, is dependent upon the cut-off of the timing tube 121. This cut-off is governed by a timing circuit comprising the capacitor 125 and the variable resistance 127. The capacitor 125 charges, after the cut-off of tube 120 and the conduction of tube 121, at a rate dependent on the value of resistance 127. When sufficient charge is reached tube 120 will again conduct and tube 121 will be cut off. The voltage at the plate of tube 121 immediately rises and applies a positive voltage pulse at the grid of tube 136. Tube 136 conducts and the contactor 141 is again energized. Contacts 143 of contactor 141 are closed to energize the solenoid 144, which in turn causes another operation of the associated machine tool to take place.

The cycle of operation described will be repeated until the operator opens the button 146, whereupon contacts 128 of relay 106 open to cause the timing circuit 119 to maintain a steady state condition with tube 121 conducting. The relay contacts 105, of relay 106, open to derange the circuit of tube 104. Thus, if the tube 120 of the timing circuit 119 were conducting, upon the button 146 being opened, the next firing of tube 121, as the circuit 119 enters the steady state condition, will not cause a movement of the index plate 16.

By adjustment of the resistance 126, which controls the start of the index plate movement, and resistance 127, which controls the start of the associated machine, the index table 16 and the associated machine can be caused to be synchronized and can be caused to operate at a rate which fits the skill of the operator. Further, spacing between positions of index can be varied by the change of gearing for the potentiometer 38. For example, gearing may be selected whereby a full revolution for the potentiometer 38 is made equivalent to a plate rotation between two openings 49. Production rates can attain high levels and the apparatus of the invention can be employed with a variety of machines without modification of either the apparatus or the machine.

Another advantage of the invention is that a relatively small drive motor may be utilized for accelerating the index plate 16 and the parts moved thereby. Since the clutch and brake have no frictional engagement when the plate 16 is at rest the motor 9 is not under load. It may therefore be small, and if a flywheel be placed on the motor shaft, a rotational energy storage may be had to supplement motor output when the clutch applies driving friction.

I claim:

1. In a drive control apparatus the combination comprising a movable index plate to be progressed in steps between successive positions of index; a signal circuit including means operated by said index plate to provide a signal responsive to plate movement; electromagnetic driving and braking means for said index plate; an input circuit for said driving and braking means electrically connected with said signal circuit for driving and braking said index plate in response to signal circuit output; a lock engageable and disengageable with said index plate; an electrically operable release for said lock to disengage the lock from the plate; a timing circuit electrically connected with said lock release and said input circuit adapted to feed periodic signal impulses to the lock release and said input circuit to cause disengagement of the lock and operation of said driving means to cause plate movement; and connections between said signal circuit and said lock release whereby said lock is caused to be held disengaged in response to signal circuit output.

2. In a drive control apparatus the combination comprising an index plate movable between successive positions of index; a signal circuit including means operated by said index plate to provide a signal responsive to plate movement; electromagnetic driving and braking means for said index plate; an input circuit for said driving and braking means electrically connected with said signal circuit for driving and braking said index plate in response to signal circuit output; a lock engageable and disengageable with said index plate; an electrically operable release for said lock to disengage the lock from the plate; and a timing circuit electrically connected with said lock release and said input circuit adapted to feed periodic signal impulses to the lock release and said input circuit to cause disengagement of the lock and operation of said driving means to cause plate movement.

3. An apparatus in accordjance with claim 2 wherein said timing circuit includes a time delay network joined with said input circuit to delay signal impulses to the signal circuit with respect to said lock release.

4. In a control drive apparatus the combination comprising an index plate movable in steps between successive positions of index; a signal circuit including means operated by said index plate providing a signal responsive to plate movement; electromagnetic driving means for said index plate; an input circuit for said driving means joined with said signal circuit for moving said index plate in response to signal circuit output; electrically operable locking means engageable and disengageable with said index plate; electric control switch means; a timing circuit electrically joined to said locking means, said input circuit for said driving means, and said electric control switch means which delivers timed alternate signals that cause lock disengagement, initial movement of said index plate, and operation of said electric control switch means; and connections between said signal circuit and said electrical lock means whereby said lock means may be held disengaged in response to signal circuit output.

5. An apparatus in accordance with claim 4 having an interlock switch with contacts operable by said locking means that are connected in circuit with said timing circuit and said electric control switch means to open the circuit therebetween when said locking means is disengaged from said index plate.

6. An apparatus in accordance with claim 4 wherein said timing circuit comprises a pair of tubes having the plate of the first joined through a capacitance to the grid of the second, with a resistance connected between the capacitance to a grid voltage source, and having the plate of the second joined through a capacitance to the grid of the first, with a resistance connected between the capacitance to a grid voltage sources, and further having a starting switch in the plate current circuit of one, whereby upon closure of said switch said tubes alternately fire and thereby vary the voltage values at the tube plates, one of said tube plates being connected to said lock release and said input circuit for the driving means of said index plate, and the other tube plate being connected to said electric switch means.

7. An apparatus in accordance with claim 1 having electric control switch means, and wherein said timing circuit comprises a pair of tubes having the plate of the first joined through a capacitance to the grid of the second with a resistance connected between the capacitance to a grid voltage source, and having the plate of the second joined through a capacitance to the grid of the first with a resistance connected between the capacitance to a grid voltage source, and further having a starting switch in the plate current circuit of one, whereby upon closure of said switch said tubes alternately fire and thereby vary the voltage values at the tube plates, one of said tube plates being connected to said lock release and said input circuit, and the other tube plate being connected to said electric control switch means.

8. In a drive control apparatus the combination comprising an index plate movable between successive positions of index; electromagnetic driving means for said index plate; an input circuit for said driving means; electric control switch means; and a timing circuit electrically joined to said input circuit for said driving means and said electric control switch means which delivers timed alternate signals that cause initial movement of said index plate and operation of said electric control switch means.

9. An apparatus in accordance with claim 8 wherein said timing circuit comprises a pair of tubes having the plate of the first joined through a capacitance to the grid of the second with a resistance connected between the capacitance to a grid voltage source, and having the plate of the second joined through a capacitance to the grid of the first with a resistance connected between the capacitance to a grid voltage source, and further having a starting switch in the plate current circuit of one, whereby upon closure of said switch said tubes alternately fire and thereby vary the voltage values at the tube plates, one of said tube plates being connected to said input circuit for the driving means of said index plate, and the other tube plate being connected to said electric control switch means.

10. An apparatus in accordance with claim 8 having an interlock switch cooperatively connected to said index plate having contacts opened when said index plate is in a position other than indexed position, said interlock contacts being joined with said timing circuit and said electric control switch means and opening the circuit therebetween when said interlock contacts are open to thereby prohibit operation of said electric control switch means.

11. In a drive control apparatus the combination comprising an index plate movable between successive positions of index; a signal circuit including means operated by said index plate providing a signal upon said plate being in a position other than an indexed position that is responsive to plate position; electromagnetic driving means for said index plate; an input circuit for said driving means joined with said signal circuit for moving said index plate in response to signal circuit output; electric switch means; and a timing circuit electrically joined to said input circuit for said driving means and said switch means which delivers timed alternate signals that cause initial movement of said index plate and operation of said switch means.

12. In a drive control apparatus the combination comprising an index table movable between successive positions of index; a signal circuit including means operated by said index plate to provide a signal responsive to plate movement; electromagnetic driving means for said index plate; an input circuit for said driving means joined with said signal circuit for moving said index plate in response to signal circuit output; electrically operable locking means engageable and disengageable with said index plate; electric switch means; a timing circuit electrically joined to said locking means, said input circuit for said driving means, and said switch means which delivers timed alternate signals that cause lock disengagement, initial movement of said index plate, and operation of said switch means; a time delay circuit network interposed between said initiating circuit and said signal circuit whereby a signal for lock disengagement and initial plate movement causes lock disengagement prior to plate movement, and connections between said signal circuit and said electrical lock means whereby said lock means is held disengaged in response to signal circuit output.

13. In a drive control apparatus the combination comprising a rotatable index plate movable between successive positions of index; an index member position responsive signal network including means operated by said index plate for providing a signal voltage upon said index plate being in a position other than indexed position which signal varies with plate position; a velocity responsive signal source including means operated by said index plate for providing a signal responsive to index plate velocity; electromagnetic driving and braking means for said index plate; an input circuit for said driving and braking means joined with said position responsive signal network and said velocity responsive signal source for driving and braking said index plate in response to signals therefrom; a lock engageable and disengageable with said index plate; an electrically operable release for said lock to disengage the lock from the plate; a timing circuit joined to said lock release and said input circuit adapted to feed signal impulses to the lock release and said input circuit to cause disengagement of the lock and energization of said driving means; and connections between said velocity responsive signal source and said lock release whereby said lock is caused to be held disengaged in response to signals therefrom.

14. In a drive control apparatus the combination comprising an index plate movable between successive positions of index; an index member position responsive signal network including means operated by said index plate for providing a signal voltage upon said index plate being in a position other than indexed position which signal varies with plate position; a velocity responsive signal source coupled to said index plate for providing a signal responsive to index plate velocity; electromagnetic driving means for said index plate; an input circuit for said driving means joined with said position responsive signal network and said velocity responsive signal source for moving said index plate in response to signals therefrom; electric switch means; and a timing circuit electrically joined to said input circuit for said driving means and said switch means which delivers timed alternate signals that cause initial movement of said index plate and operation of said switch means.

15. In a drive control apparatus the combination comprising an index plate movable between successive positions of index; a drive motor for the index plate; an electro-magnetic brake for the index plate; an electro-magnetic friction coupling between said index plate and said drive motor; an input circuit for the electromagnetic means; a signal circuit including means operated by said index plate to give a signal responsive to plate movement, which signal circuit is connected to the input circuit for controlling said brake and said coupling; a control switch having contacts connected to the input circuit and having a contact position normally causing the input circuit to have the electromagnetic friction coupling disengage the motor from the index plate; a circuit connected to the input circuit adapted to cause the input circuit to operate the electromagnetic friction coupling to make initial engagement of the motor and index plate through said coupling; and connections between the signal circuit and said control switch causing said switch to move out of said contact position upon said signal circuit indicating said index plate to be in motion toward a successive position of index.

16. In a mechanism for driving a member in indexed steps the combination comprising an index member to be driven between positions of index; a position responsive signal circuit cooperatively related to said index member to provide a voltage signal responsive to index member position, which signal decreases as the member moves toward a position of index; a velocity responsive signal generator cooperatively related to said index member to provide a signal proportional to index member velocity; electromagnetic means for accelerating and decelerating said index member; connections joining the position responsive signal circuit and velocity responsive signal generator in opposition to provide a composite signal; an input circuit between said connections and said electromagnetic means to cause the electromagnetic means to drive the index member upon the composite signal being predominated by the position responsive signal circuit, and to brake the index member upon the composite signal being predominated by the signal generated by the velocity responsive generator, whereby the index member velocity is proportional to its position and decreases to zero as a position of index is assumed; and an electrically operated lock engageable with said index member when in a position of index to retain the member in such position, which lock has a disengaged position and is cooperatively joined to said velocity responsive generator to be moved to disengaged position upon the velocity responsive generator emitting a signal responsive to index member movement.

17. An apparatus in accordance with claim 16 having circuit means for disabling said input circuit to interrupt braking and driving for said electromagnetic means, which circuit means is cooperatively joined to said velocity responsive generator to disable the input circuit upon the index member being at standstill.

References Cited in the file of this patent
UNITED STATES PATENTS

| | | |
|---|---|---|
| 1,155,124 | Berger | Sept. 28, 1915 |
| 2,011,488 | Swahnberg | Aug. 13, 1935 |
| 2,464,996 | Shafer et al. | Mar. 22, 1949 |
| 2,537,269 | Harding | Jan. 8, 1951 |
| 2,542,821 | Ljunggren et al. | Feb. 20, 1951 |
| 2,575,792 | Bullard | Nov. 20, 1951 |
| 2,627,647 | Hautan | Feb. 10, 1953 |
| 2,662,146 | Wilentchik | Dec. 8, 1953 |
| 2,672,067 | Hansell | Mar. 16, 1954 |
| 2,697,470 | Sampatacos et al. | Dec. 21, 1954 |
| 2,779,449 | Lambach et al. | Jan. 29, 1957 |
| 2,796,776 | Locke et al. | June 25, 1957 |